United States Patent [19]
Takegami et al.

[11] Patent Number: 5,333,079
[45] Date of Patent: Jul. 26, 1994

[54] LOW PROFILE HARD DISK APPARATUS

[75] Inventors: Kiyoyoshi Takegami, Omihachiman; Itsuo Miyaji, Yokaichi; Hiroyuki Yonei, Shiga; Kihachiro Ohta, Naka, all of Japan

[73] Assignee: Nippon Densan Corporation, Kyoto, Japan

[21] Appl. No.: 920,776

[22] Filed: Jul. 28, 1992

[30] Foreign Application Priority Data

Aug. 5, 1991 [JP] Japan .................. 3-220903
Aug. 19, 1991 [JP] Japan .................. 3-232258
Sep. 30, 1991 [JP] Japan .................. 3-280859

[51] Int. Cl.⁵ .......................................... G11B 17/02
[52] U.S. Cl. ............................................... 360/99.08
[58] Field of Search ............... 360/99.08, 99.04, 97.02, 360/106, 98.07

[56] References Cited

U.S. PATENT DOCUMENTS

| | | | |
|---|---|---|---|
| 4,922,406 | 5/1990 | Schuh | 360/99.08 |
| 4,930,029 | 5/1990 | Morita | 360/97.01 |
| 4,943,748 | 7/1990 | Shiozawa | 360/98.07 |
| 5,025,335 | 7/1991 | Stefansky | 360/97.01 |
| 5,029,026 | 6/1991 | Stefansky et al. | 360/97.02 |
| 5,274,288 | 12/1993 | Stefansky | 360/99.08 |

*Primary Examiner*—Robert S. Tupper

[57] ABSTRACT

An annular recess is formed in a base which constitutes a disk chamber, and an armature constituting a spindle motor for driving a hard disk and composed of a stator core and a stator coil and a field device composed of a rotor yoke and a rotor magnet are substantially accommodated in the annular recess. As a result, the height of a portion of a hard disk apparatus which constitutes a radial directional gap type spindle motor can be minimized and therefore the overall height of the apparatus can be minimized. Hence, the thickness and the size of a computer apparatus or the like which includes the hard disk apparatus can be reduced.

13 Claims, 7 Drawing Sheets

LOW PROFILE HARD DISK APPARATUS

FIELD OF THE INVENTION

The present invention relates to a hard disk apparatus for use to serve as a storage apparatus of a computer system.

DESCRIPTION OF THE PRIOR ART

Recently, there a desire in reducing the thickness and the size of computer apparatuses such as the notebook-type personal computers. In order to meet the aforesaid desires, there is also desire in reducing the thickness and the size of the hard disk apparatus for use in a variety of computer apparatuses.

Hitherto, the spindle motor for driving the hard disk has been individually manufactured and it has been fastened to the base member of the disk chamber of the hard disk apparatus. By employing a means in which the base men%her of the disk chamber is utilized as the component member of the spindle motor, the aforesaid desires can be substantially met.

However, a limit is present in reducing the thickness and the size by employing the aforesaid means. That is, the height of the motor cannot be shortened in a case where the spindle motor is a radial directional gap type motor so arranged that its armature and a field means are disposed to face each other in the radial direction of the spindle motor. Therefore, the aforesaid desire to reduce the overall thickness of the apparatus cannot be met satisfactorily.

The thickness of the motor can be effectively reduced by employing an axial directional gap type motor so arranged that the armature and the field means are disposed to face each other in the axial direction of the motor. However, the aforesaid arrangement causes the radius of the motor to be enlarged relatively when required power is intended to be obtained. Therefore, the desire of reducing the size of the apparatus cannot be met satisfactorily.

In order to prevent a read/write error which will be taken due to contamination of the hard disk caused by the lubricating agent or the like for the bearing introduced into the disk chamber, the inside and the outside of the spindle motor in the disk chamber must be sealed up as hermetically as possible. However, a sealing means employed to achieve the aforesaid object will hinder the intention of reducing the overall thickness of the spindle motor to reduce the overall thickness of the hard disk apparatus.

Incidentally, the hard disk apparatus is so arranged that a hard disk is held at the rotational portion in the disk chamber thereof and the hard disk is rotated in the rotational portion. However, when the hard disk is rotated in the disk chamber, an air flow is generated on the surface of the hard disk. Since the hard disk apparatus has the hard disk which is rotated at a high speed, the flow velocity is raised and therefore the pressure in the portion, in which the air flow has been generated, is lowered.

When the pressure has been lowered, dust and oil particles are sucked out from the inside portion of the rotational portion, for example, the spindle motor, causing the hard disk to be contaminated and therefore the aforesaid errors to occur.

Accordingly, the aforesaid fact that the pressure is undesirably lowered has been prevented by forming an air communication hole with which the inside and the outside portions of the disk chamber are communicated with each other via a filter thereof. However, since the reduction in the size of the hard disk will reduce the size of the air communication hole, the aforesaid effect of preventing the pressure from being undesirably lowered cannot be obtained satisfactorily. On the contrary, if the size of the air communication hole is enlarged in order to overcome the aforesaid problem, another problem takes place in that dust or the like is undesirably introduced into the disk chamber from the outside portion via the filter.

SUMMARY OF THE INVENTION

A first object of the present invention is to provide a hard disk apparatus capable of minimizing the overall height of the apparatus by minimizing the height of a spindle motor for driving a hard disk and utilize a portion of a base of a disk chamber.

A second object of the present invention is to provide a hard disk apparatus capable of further reducing the overall height of the apparatus by disposing a circuit substrate by effectively utilizing a space.

A third object of the present invention is to provide a hard disk apparatus capable of effectively preventing a lubricating agent or the like of a bearing from flying into the disk chamber.

A fourth object of the present invention is to provide a hard disk apparatus capable of preventing read/write errors or undesirable fixation of the magnetic head due to contamination of the inside portion of the disk chamber and the hard disk apparatus by preventing dust or oil particles from being sucked out from the inside portion of the spindle motor due to the lowered pressure.

Other and further objects, features and advantages of the invention will be appear more fully from the following description.

DETAILED DESCRIPTION OF THE PREFERRED EMBODIMENTS

Figure 1:
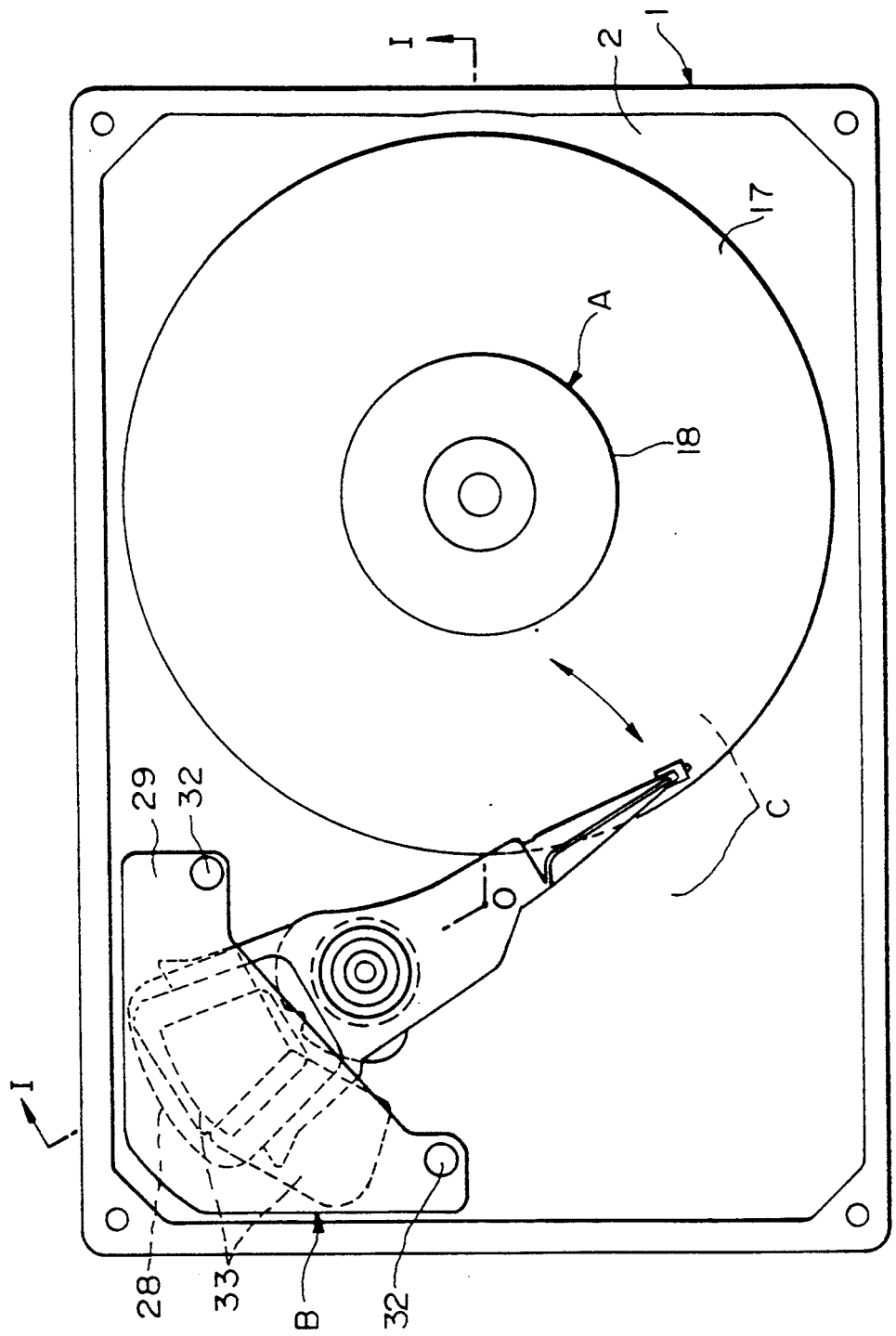
FIG. 1 is a plan view which illustrates a first embodiment of a hard disk apparatus according to the present invention where the cover of a disk chamber is removed.
Figure 2:
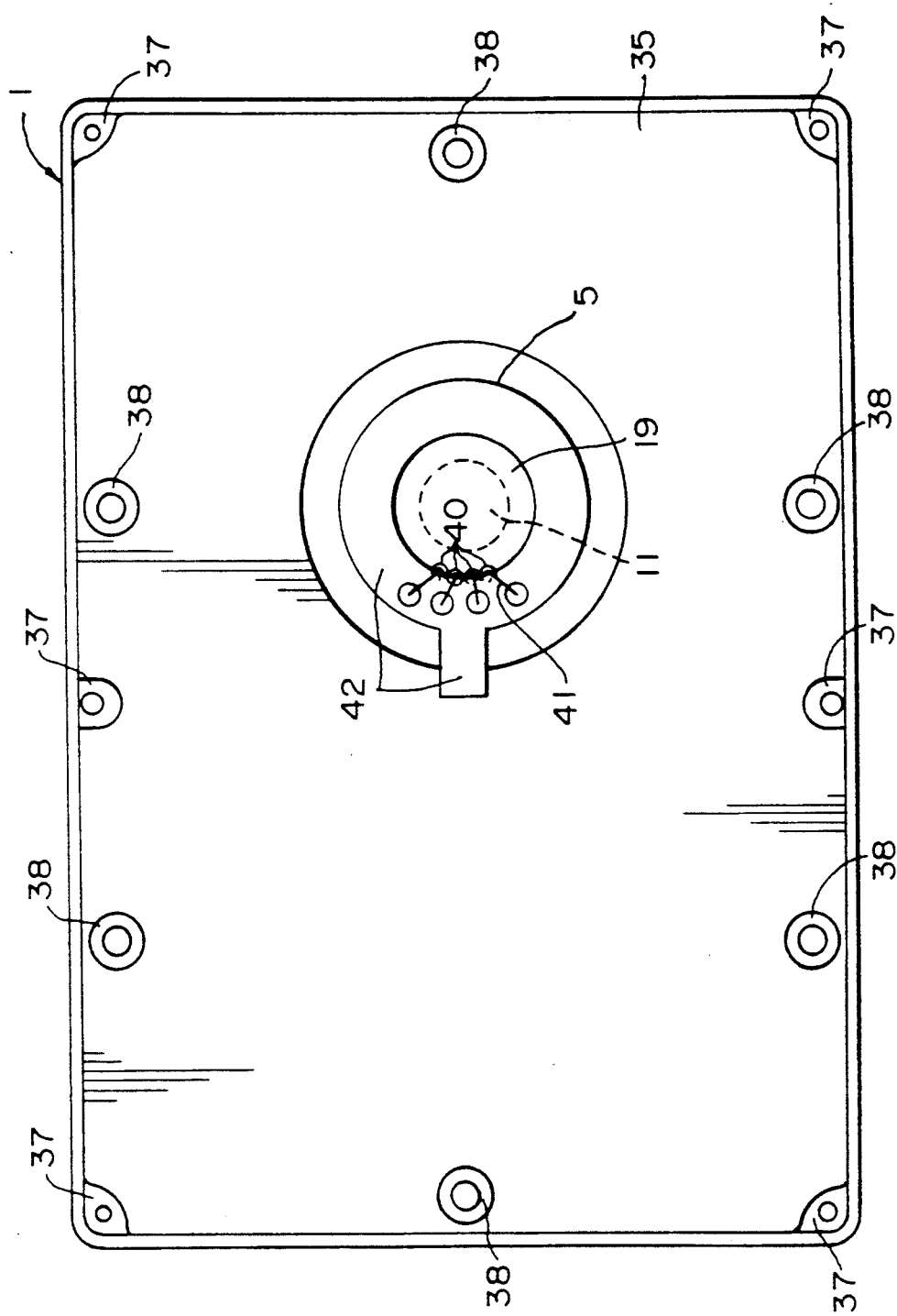
FIG. 2 is a bottom view of the hard disk apparatus shown in FIG. 1.
Figure 3:
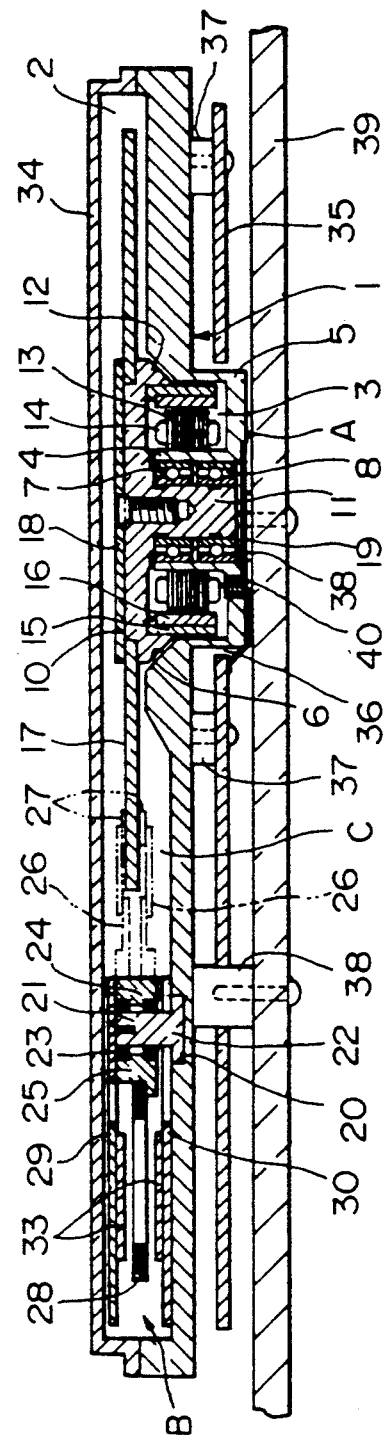
FIG. 3 is a front elevational cross sectional view taken along line 1-O-1 of the hard disk apparatus shown in FIG. 1.
Figure 4:
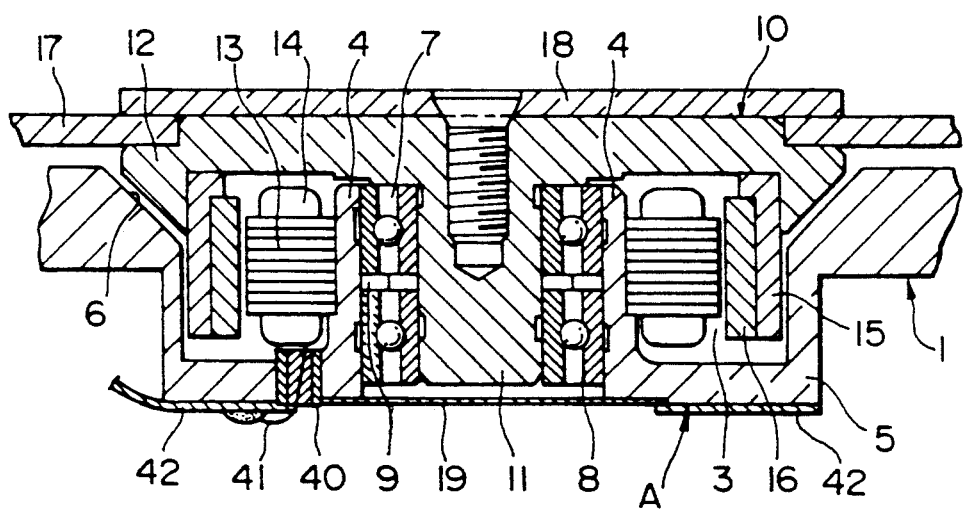
FIG. 4 is an enlarged view which illustrates the spindle motor of the hard disk apparatus shown in FIG. 3.

Preferred embodiments of the present invention will now be described with reference to the drawings.

First, a first embodiment of a hard disk apparatus according to the present invention will now be described with reference to FIGS. 1 to 4.

A disk chamber 2 is formed on a base 1. An annular recess 3 opened inside the disk chamber 2 is formed at a position relatively deviated to the right from the center of the base 1 when viewed in FIG. 1. Furthermore, a cylindrical portion 4 is erected on the inner bottom portion of the annular recess 3 to reach a position adjacent to the inner height (a position slightly lower than that in this embodiment) of the disk chamber 2 of the base 1. The inner portion of the cylindrical portion 4 is made to be a through hole portion. The outside of the annular recess 3 over the disk chamber 2 is formed into a projection portion 5. Furthermore, the outside portion of the opened portion of the annular recess 3 is formed into an expansion portion 6 expanding slightly.

The outer ring of a first ball bearing 7 and that of a second bearing 8 are secured to the inner wall of the cylindrical portion 4 by an adhesive agent. A cylindrical spacer 9 is interposed between the first bearing 7 and the second bearing 8.

A rotational shaft 11 is allowed to project in the central portion of a rotor hub 10, the rotational shaft 11 having an outer surface to which the inner ring of the first ball bearing 7 and that of the second ball bearing 8 are secured by an adhesive agent. The rotor hub 10 has an outer wall 12 expanding outwards, the rotor hub 10 being formed into a horn-like shape the diameter of which is reduced downwards. As a result, the lower portion of the rotor hub 10 faces the expansion portion 6 of the annular recess 3 while interposing a slight gap.

A stator core 13 is secured around the outer wall of the cylindrical portion 4, the stator core 13 having a stator coil 14 wound thereto. The upper end portion of a rotor yoke 15 formed into a cylindrical shape is secured to the outer wall 12 of the rotor hub 10. A rotor magnet 16 formed into a cylindrical shape is secured to the inside of the rotor yoke 15. The rotor magnet 16 and the stator core 13 face each other while interposing a circumferential gap.

The aforesaid rotor yoke 15, the rotor magnet 16 (field means), the stator core 13 and the stator coil 14 (armature) are accommodated in the annular recess 3. Furthermore, a labyrinth seal effect can be realized by the rotor magnet 16, the rotor yoke 15, the rotor hub 10, the annular recess 3 and its expansion portion 6, so that the undesirable introduction of the oil particles and dust into the disk chamber 2 is prevented.

A hard disk 17 is mounted on the outer wall 12 of the rotor hub 10 to surround the rotor hub 10. A clamp member for securing and holding the hard disk 17 is fixed to the end surface of the rotor hub 10 with a screw. The inner portion of the cylindrical portion 4 formed into the through hole is sealed up by a sealing member 19 at the lower end portion when viewed in FIG. 3.

The aforesaid annular recess 3, the cylindrical portion 4, the first ball bearing 7, the second ball bearing 8, the rotor hub 10, the stator core 13, the stator coil 14, the rotor yoke 15 and the rotor magnet 16 constitute a spindle motor A for rotating the hard disk 17. Since the annular recess 3 serving as the component member of the spindle motor A is integrally formed with the base 1, the overall height of the apparatus can be reduced. Furthermore, the end portion of the cylindrical portion 4 and the inner surface of the disk chamber 2 of the base 1 are made to be substantially the same height. Moreover, the first ball bearing 7 and the second ball bearing 8 are held inside the cylindrical portion 4, and as well as the rotor yoke 15, the rotor magnet 16, the stator core 13 and the stator coil 14 are accommodated in the annular recess 3. Therefore, the height of a portion which constitutes the radial directional gap type spindle motor A can be minimized.

A circular recess 20 is formed in the relatively upper left portion of the base 1 when viewed in FIG. 1, the circular recess 20 having a base portion 22 of a fixed shaft 21 fastened thereto. Furthermore, a rotational sleeve member 25 is rotatively supported by the fixed shaft 21 via a third ball bearing 23 and a fourth ball bearing 24. An arm member 26 projects from the rotational sleeve member 25 toward the hard disk 17, the arm member 26 having magnetic heads 27 so formed at the leading portion thereof that they are respectively located on the two sides of the hard disk 17.

A movable coil 28 is secured to the rotational sleeve member 25 in the portion which opposes the arm member 26.

A first yoke 29 is secured to an end portion of the fixed shaft 21 with a screw, while a second yoke 30 is fastened to the fixed shaft 21. The base 1 has a thread hole (omitted from illustration) for locating the yokes 29 and 30. A locating and fixing bolt 32 penetrates the first and the second yokes 29 and 30 so as to be received by the aforesaid thread hole.

A pair of permanent magnetic plates 33 each of which is formed into a sector like shape are respectively secured to the facing surfaces of the first and the second yokes 29 and 30. It is preferable that the permanent magnetic plates 33 be Nd-Fe-B type magnets.

The fixed shaft 21, the third ball bearing 23, the fourth ball bearing 24, the rotational sleeve member 25, the movable coil 28, the first yoke 29, the second yoke 30 and the permanent magnetic plates 33 constitute a voice coil motor B for rotating the arm member 26 so as to move and locate the magnetic heads 27. The height of the base 1 is lowered in the portions which correspond to the voice coil motor B, the arm member 26 and movable range C in which the magnetic head 27 moves.

A cover member 34 which forms the disk chamber 2 is formed into a box-like shape. The disk chamber 2, which is formed by fastening the cover member 34 to the base 1, hermetically accommodates the spindle motor A, the hard disk 17, the voice coil motor B, the arm member 26 and the magnetic head 27 and the like.

A circuit substrate 35 has a circular hole 36 formed therein. The circuit substrate 35 is secured between the outer surface (the lower surface when viewed in FIG. 3) of the disk chamber 2 of the base t and the bottom surface of the projection portion 5 in a state where the projection portion 5 is received by the circular hole 36 in the portion below the disk chamber 2 when viewed in FIG. 3. The circuit substrate 35 is secured as described above in such a manner that it is fixed to a short projection portion 37 with a screw, the short projection portion 37 downwards projecting when viewed in FIG. 3.

Since the spindle motor A is the radial directional gap type motor, the horizontal cross sectional area of the projection portion 5 can be relatively reduced. As a result, a sufficiently large space can be formed around the projection portion 5 at a position between the outer surface of the disk chamber 2 of the base 1 and the bottom surface of the projection portion 5. Therefore, the circuit substrate 35 is placed in the aforesaid space while effectively utilizing the space. As a result, the overall height of the apparatus can be shortened.

A long projection portion 38 projecting downwards is formed on the base 1, the long projection portion 38 being used to fix the base 1 to a body 39 in which the hard disk apparatus is loaded.

A rubber tube 40 is received by a through hole formed in the bottom plate of the annular recess 14, the rubber tube 40 being a tube through which a lead wire 41 is pulled out from the spindle motor A. The lead wire 41 is connected to a flexible substrate 42. The flexible substrate 42 is electrically connected to a terminal portion formed in the circuit substrate 35.

The above-described hard disk apparatus is so arranged that the armature fixed to the outer surface of the cylindrical portion 4 and composed of the stator core 13 and the stator coil 14 and the field means secured to the rotor hub and composed of the rotor yoke 15 and the rotor magnet 16 are substantially accommodated in the annular recess 3. Therefore, the height of the portion which constitutes the radial directional gap type spindle motor A can be minimized.

Furthermore, the end portion of the cylindrical portion 4 and the inner surface of the disk chamber 2 of the base 1 are made to be substantially the same height. Hence, the height of the portion including the spindle motor A can be minimized and therefore the overall height of the apparatus can be minimized. As a result, the thickness and the size of a computer apparatus or the like which includes the hard disk apparatus can be satisfactorily reduced.

In addition, the spindle motor A is the radial directional gap type motor, so that the horizontal cross sectional area of the projection portion 5 can be relatively reduced. Furthermore, a sufficiently large space can be formed around the projection portion 5 at a position between the outer surface of the disk chamber 2 of the base 1 and the bottom surface of the projection portion 5. The aforesaid space can be effectively used to place the circuit substrate 35 so that the overall height of the apparatus can be reduced.

Figure 5:
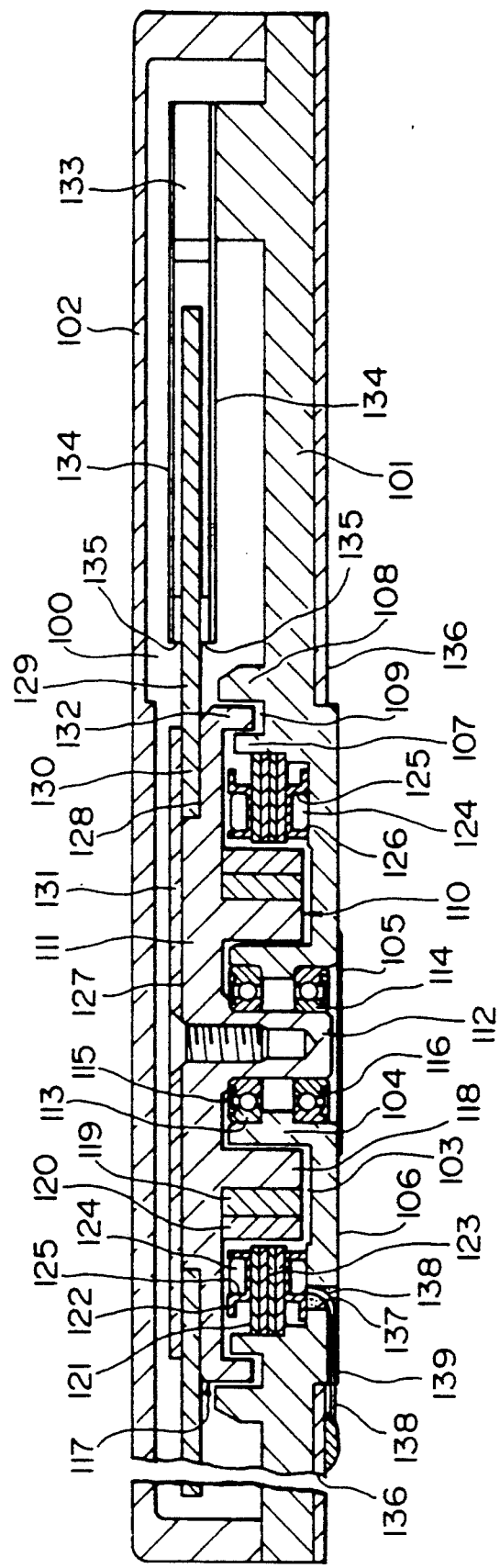
FIG. 5 is a cross sectional view which illustrates a second embodiment of the hard disk apparatus according to the present invention.

A second embodiment of the hard disk apparatus according to the present invention will now be described with reference to FIG. 5.

A disk chamber 100 is composed of a base 101 and a cover 102 which covers the upper surface of the base 101. The base 101 has an annular recess 103 opened inside the disk chamber 100, the annular recess 103 having an inner wall constituted by a cylindrical portion 104 formed integrally with the base 101 and arranged to hold a bearing. The cylindrical portion 104 has a through hole therein, the through hole having the lower opening portion which is sealed up by a sealing member 105. The outer portion of the disk chamber 100 is formed into a projection portion 106 slightly projecting downwards. The annular recess 103 has an outer wall 107 which is made to be substantially the same height from the surface of the base 101 as the height of the cylindrical portion 104.

An annular projection portion 108 projecting upwards over the base 101 is formed outside the outer wall 107 and concentrically with the outer wall 107 at a radial directional interval. As a result, an annular groove portion 109 is formed between the outer wall 107 and the annular projection portion 108.

A rotational shaft 112 projecting downwards is formed in the central portion of a disc-like base portion 111 of a rotor hub 110 so as to be rotatively supported on the inside of the cylindrical portion 104 via a first ball bearing 113 and a second ball bearing 114 disposed vertically. The first ball bearing 113 disposed in the upper portion has a shield plate 115 only above the bearing balls, and the dimension below the bearing balls arranged to be a short distance. The second ball bearing 114 disposed in the lower portion contrarily has a shield plate 116 only below the bearing balls, and the dimension above the bearing balls is arranged to be a short distance. Hence, undesirable flying of the lubricating agent or the like used in the first and the second ball bearings 113 and 114 through the upper opening portion of the cylindrical portion 104 can be prevented satisfactorily. Furthermore, the axial directional dimension of the spindle motor 117 can be shortened so that the thickness of the hard disk apparatus can be further reduced. Incidentally, since the shield plate 116 for the second ball bearing 114 positioned in the lower portion can be omitted from the structure of this embodiment arranged as described above, the axial directional size can be further shortened by omitting the shield plate 116.

An annular wall 118 projecting downwards over the base portion 111 of the rotor hub 108 to reach a position adjacent to the bottom surface of the annular recess 103 is located outside the cylindrical portion 104 while interposing a small radial directional distance from the cylindrical portion 104. A cylindrical rotor yoke 119 is secured to the outer surface of the annular wall 118. Furthermore, a cylindrical rotor magnet 120 is secured to the outer surface of the aforesaid rotor yoke 119.

A stator core 121 is so secured to the outer surface of the annular recess 103 that it faces the rotor magnet 120 at a radial directional gap from the outer surface of the rotor magnet 120. A coil accommodating and insulating member 122 made of a synthetic resin has an accommodating groove portion 125 for accommodating a stator coil 124, the accommodating groove portion 125 being formed in the outer surface of a tooth 123 in such a manner that the coil accommodating and insulating member 122 covers the outer surface of the tooth 123 of the stator core 121. The stator coil 124 is wound around the aforesaid accommodating groove portion 125. An annular surface of the bottom of the annular recess 103 is raised slightly so as to, thereon, hold an annular thin plate insulating member 126 made of a synthetic resin. The coil accommodating insulating member 122 insulates between the stator coil 124 and the stator core 121, while the annular thin plate insulating member 126 insulates between the stator coil 124 and the base 101.

The aforesaid rotor yoke 119, the rotor magnet 120 (field means), the stator core 121 and the stator coil 124 (armature) are accommodated in the annular recess 103.

The outer portion of a circular upper surface 127 of the base portion 111 of the rotor hub 110 is arranged to be a disk contact surface 128 formed into an annular shape positioned lower than the circular upper surface 127. A hard disk 129 is mounted in such a manner that the lower surface of an inner portion 130 of the hard disk 129 is positioned in contact with the aforesaid disk contact surface 128. The aforesaid inner portion 130 of the hard disk 129 is held and secured between a circular clamp member 131 fixed to the rotor hub 110 with a screw and the contact surface 128.

An annular projection portion 132 projecting downwards is formed on the outer surface of the base portion 111 of the rotor hub 110. The annular projection portion 132 is so inserted into the annular groove portion 109 that a small gap is present from the inner surface of the annular groove portion 109.

A support arm 134 arranged to be driven by a voice coil motor 133 supports magnetic heads 135. When the voice coil motor 133 is rotated, the magnetic heads 135 supported by the support arm 134 move on the two sides of the hard disk 129.

A flexible circuit substrate 136 is so mounted around the projection portion 25 that it is fixed to the lower surface of the base 10.

A lead wire 138 is pulled out from the inside portion of the spindle motor 117 through a though hole 137 formed in the bottom plate of the annular recess 103. The lead wire 138 is introduced to a terminal of the flexible circuit substrate 136 after it has passed through a guide groove 139 formed in the projection portion 106, the lead wire 138 being then fixed to the terminal by soldering. The aforesaid through hole 137 is filled with a synthetic resin so as to be closed hermetically.

The spindle motor 117 for driving the hard disk 129 is constituted by the annular recess 103, the cylindrical portion 104, the first ball bearing 113, the second ball bearing 114, the rotor hub 110, the rotational shaft 112, the rotor yoke 119, the rotor magnet 120, the stator core 121, and the stator coil 124.

This embodiment is so arranged as described above that the annular recess 103 and the cylindrical portion 104 of the spindle motor 117 are integrally formed with each other, the height of the cylindrical portion 104 and the outer wall 107 of the annular recess 103 from the base 101 are made to be substantially the same height, and the stator core 121, the stator coil 124, the rotor magnet 120 and the rotor yoke 119 are substantially accommodated in the annular recess 103. Hence, the height of the radial directional gap type spindle motor portion can be minimized.

Furthermore, an excellent sealing effect can be obtained from a labyrinth sealing structure formed by the cylindrical portion 104, the annular recess 103, the annular wall 118, the rotor yoke 119, the rotor magnet 120, the stator core 121, the stator coil 124, which are substantially accommodated in the annular recess 103, the annular groove portion 109 and the annular projection portion 132. Although a slight quantity of lubricating agent or the like can be leaked out from the first and the second ball bearings 113 and 114 held inside the cylindrical portion 104 into the upper opening portion of the cylindrical portion 104 even if the shield plate 115 is provided for the first ball bearing 113, the aforesaid sealing effect will significantly effectively prevent flying of the lubricating agent or the like of the two ball bearings 115 and 116 held inside the cylindrical portion 104 into the disk chamber 100. Therefore, the necessity of providing another sealing means can be eliminated and the overall thickness of the apparatus can be reduced by a degree which corresponds to the omitted sealing means.

Although larger torque can be generated by employing the inner rotor type spindle motor 117 as in the aforesaid embodiment, an outer rotor type spindle motor may be employed.

Then, a third embodiment of the hard disk apparatus according to the present invention will now be described with reference to FIGS. 6 and A base 202 which forms a disk chamber 201 has an annular recess 203 formed at a relatively right center position when viewed in FIG. 6. Furthermore, a cylindrical projection portion 204 is erected from the inner bottom portion of the annular recess 203 toward the inside of the disk chamber 201. The inside of the cylindrical projection portion 204 is formed into a through hole. Furthermore, the outer portion of the opening portion of the annular recessed portion 203 is formed into a large-diameter portion 205 having a relatively enlarged outer diameter.

The outer ring of a first ball bearing 206 and that of a second ball bearing 207 are secured to an inner wall 208 of the cylindrical projection portion 204 with an adhesive agent. Furthermore, a cylindrical spacer 209 is interposed between the first ball bearing 206 and the second ball bearing 207.

A hollow rotational shaft 211 projects at the inside portion of the central portion of a cup-like rotor hub 210, the rotational shaft 211 having the inner ring of the first ball bearing 206 and that of the second ball bearing 207 secured to the outer surface thereof with an adhesive agent.

A stator core 213 secured to an outer wall 212 of the cylindrical projection portion 204 has a stator coil 214 wound thereto. A rotor magnet 216 secured to the inside of a circumferential wall 215 of the rotor hub 210 faces the stator core 213 while interposing a circumferential gap.

An opening end portion 217 of the circumferential wall 215 of the rotor hub 210 is inserted into the annular recess 203 to substantially reach its bottom. An outer flange portion 218 formed at an intermediate portion of the circumferential wall 215 is fitted in the large-diameter portion 205 formed in the opening portion of the annular recess 203. A labyrinth seal effect can be obtained by the rotor magnet 216, the rotor hub 210, the outer flange portion 218, the annular recess 203 and its large-diameter portion 205. As a result, the undesirable introduction of the oil particles and dust into the disk chamber 203 can be prevented.

A first hard disk 219 is mounted on a portion around the outer flange portion 218 formed on the outer surface of the rotor hub 210. Furthermore, an annular spacer 220 is disposed on the first hard disk 219, and a second hard disk 221 is mounted on the spacer 220.

A clamp member 222 for securing and holding the first and the second hard disks 219 and 221 is fitted to an end surface of the rotor hub 210 with a screw.

Figure 7:
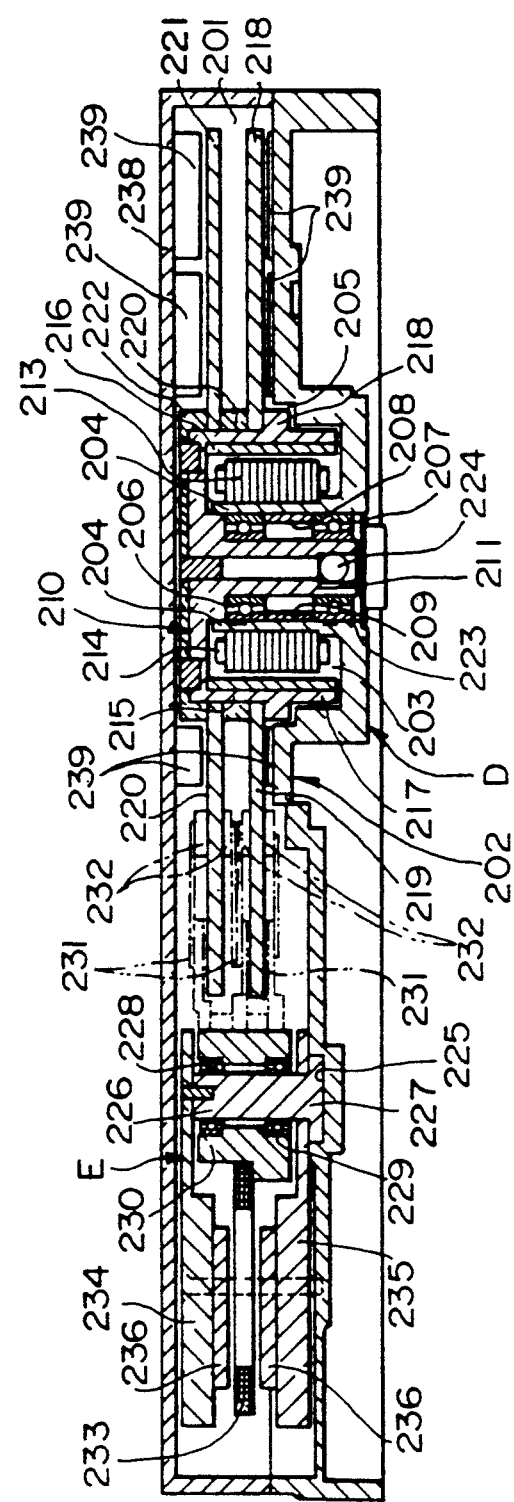
FIG. 7 is a front elevational cross sectional view taken along line II-O-II of the hard disk apparatus shown in FIG. 6.

The lower end portion of the inner portion of the cylindrical projection portion 204 when viewed in FIG. 7 is sealed up with a sealing member 223. An end portion of the hollow portion of the rotational shaft 211 is closed by a rubber ball 224.

A spindle motor D for driving the hard disks is constituted by the aforesaid annular recess 203, the cylindrical projection portion 204, the first ball bearing 206, the second ball bearing 207, the rotor hub 210, the stator core 213, the stator coil 214, and the rotor magnet 216 and the like. Since the annular recess 203 of the spindle motor D is integrally formed with the base 202, the overall height of the apparatus can be shortened.

Figure 6:
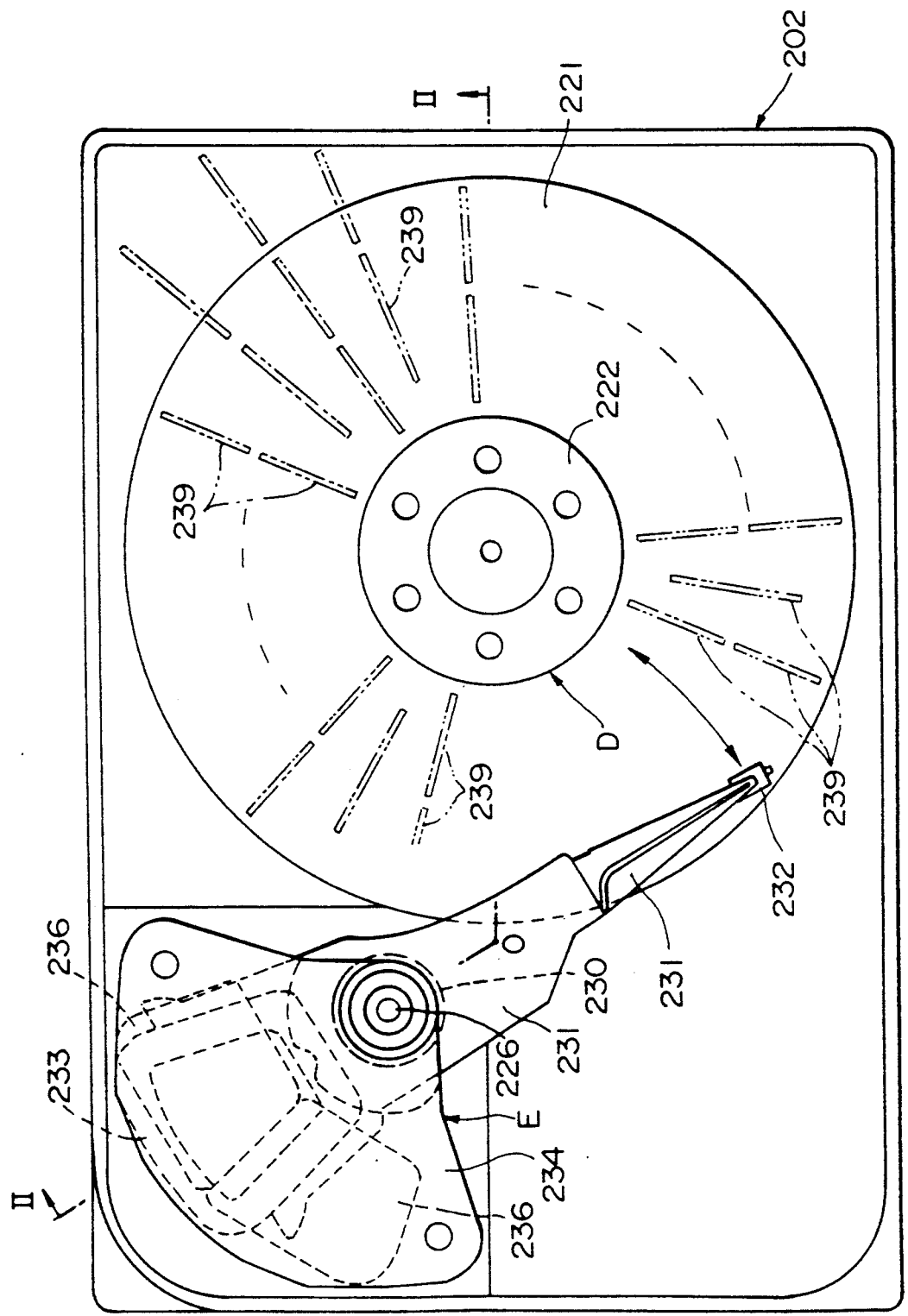
FIG. 6 is a plan view which illustrates a third embodiment of the hard disk apparatus according to the present invention.

A circular recess 225 is formed at a relatively upper right position of the base 202 when viewed in FIG. 6. Furthermore, a base portion 227 of a fixed shaft 226 is received and secured at the aforesaid circular recess 225. In addition, a rotational sleeve member 230 is rotatively supported by the fixed shaft 226 via the third and the fourth ball bearings 228 and 229.

An arm member 231 is allowed to project from the rotational sleeve member 230 toward the first and the second hard disks 219 and 221. Magnetic heads 232 provided at the leading portions of the arm member 231 are respectively located to face the corresponding sides of the first and the second hard disks 219 and 221. A movable coil 233 is secured to the rotational sleeve member 230 in a portion opposing the arm member 231.

A first yoke 234 is fixed to an end portion of the rotational shaft 226 with a screw, while a second yoke 235 is fitted to the rotational shaft 226.

A pair of permanent magnetic plates 236 respectively formed into sectors are secured to the facing surfaces of the first and the second yokes 234 and 235.

A voice coil motor E for rotating the arm member 231 so as to move and locate the magnetic heads 232 is constituted by the fixed shaft 226, the third ball bearing 228, the fourth ball bearing 229, the rotational sleeve member 230, the movable coil 233, the first yoke 234, the second yoke 235, the permanent magnetic plate 236 and the like.

A cover member 238 for covering the disk chamber 201 is formed into a box-like shape. The disk chamber 201 formed by fastening the cover member 237 to the base 202 hermetically accommodates the spindle motor D, the first and the second hard disks 219 and 221, the voice coil motor E, the arm member 231 and the magnetic head 232.

Fins (projection portion) 239 are allowed to project over the lower surface of the cover member 238 and the upper surface of the base 202 when viewed in FIG. 7. A multiplicity of fins 239 allowed to project over the lower surface of the cover member 238 are radially disposed in the radial directions of the first hard disk 219 to face the upper surface of the first hard disk 219. On the other hand, a multiplicity of the fins 239 allowed to project over the upper surface of the base 202 are radially disposed in the radial direction of the second hard disk 221 to face the lower surface of the second hard disk 221. However, no fins are formed in the region in which the arm member 231 and the magnetic head 232 are moved.

When the first and the second hard disks 219 and 221 are rotated by the spindle motor D, air flow is generated toward the centers of the surfaces of the first and the second hard disks 219 and 221. The centers of the disks 219 and 221 are protected from the air flow by fins 239. The fins 239 prevent lowering of the air pressure and the resulting air flow around the surfaces of the first and second hard disks 219 and 221. As a result, the undesirable fact that the dust and the oil particles are sucked from the inside portion of the spindle motor D due to the low pressure can be prevented. Consequently, the contamination of the inside portion of the disk chamber 201 and the surfaces of the first and the second hard disks 219 and 221 which will cause read/write errors and undesirable fixation of the magnetic head 232 can be prevented.

Although this embodiment is so arranged that the projecting fins 239 are disposed on both the lower surface of the cover member 238 and the upper surface of the base 202, a desired effect can be obtained in a case where the fins are disposed on either of the surfaces.

According to the thus arranged embodiment, the fins 239 capable of preventing the air flow generated due to the rotation of the hard disk 221 will prevent the fact the pressure is undesirably lowered due to the rise in the flow velocity of the aforesaid air flow.

Therefore, the fact that the dust or the oil particles are sucked out from the inside of a rotational portion, for example, the spindle motor D, due to the pressure reduction can be prevented while minimizing the undesirable introduction of dust or the like into the disk chamber 201 by relatively reducing the area of the air communication hole which communicates the inside and the outside portions of the disk chamber 201 with each other via the filter. Consequently, the contamination of the inside portion of the disk chamber 201 and the surfaces of the hard disks 219 and 221, which will cause read/write errors and the undesirable fixation of the magnetic head, can be prevented.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A hard disk apparatus comprising:
   a base;
   a cover member defining a disk chamber in cooperation with the base;
   a spindle motor disposed in the disk chamber;
   a hard disk to be rotated by the spindle motor;
   a circuit substrate to control the spindle motor, the circuit substrate defining a hole to surround the spindle motor;
   a hollow cylindrical portion extending in a direction transverse to that of surfaces of the base and the cover member, the cylindrical portion having an inner portion defining an axially extending armature recess opening for supporting a shaft of a spindle motor;
   a projection portion provided on the base and concentrically surrounding the cylindrical portion, the projection portion extending downwardly relative to the base and in a direction parallel to that of the cylindrical portion, the projection portion and the cylindrical portion cooperating with one another to define an annular recess;
   the spindle motor comprising a shaft extending through the armature recess, a pair of bearings for rotatably supporting the shaft, a rotor hub to rotate with the shaft and to support the hard disk, field means mounted on the rotor hub, and an armature mounted on an outer portion of the cylindrical portion, the armature being in opposition to the field means; and
   the annular recess accommodating the pair of bearings, the field means, the armature, and a substantial portion of the shaft to reduce the height of the hard disk apparatus in an upward/downward direction.

2. A hard disk apparatus according to claim 1, wherein said cylindrical portion substantially extends along the inner height of the disk chamber formed on said base from an inner bottom surface of said annular recess to a position adjacent to the cover member.

3. A hard disk apparatus according to claim 1, wherein an expansion portion of the base extends radially outwardly relative to said annular recess, a circumferential wall of said rotor hub extends radially outwardly from an upper longitudinal end of the shaft of the spindle motor, and said circumferential wall of said rotor hub is close to the expansion portion.

4. A hard disk apparatus according to claim 1 further comprising:
   a circular recess formed in the hard disk apparatus;
   a base portion to receive a fixed shaft;
   a fixed shaft extending through the circular recess;

a rotational sleeve member rotatably supported by the fixed shaft by means of bearings;

an arm projecting toward the hard disk secured to the rotational sleeve member; and magnetic heads disposed at a leading portion of the arm so that each of the magnetic heads faces a different side of the hard disk.

5. A hard disk apparatus according to claim 1, further including:

a through hole defined in a bottom portion of the annular recess; and a lead wire connected to the armature and extending through the through hole to a location outside the hard disk apparatus.

6. A hard disk apparatus according to claim 5, wherein said through hole is sealed with rubber or a synthetic resin.

7. A hard disk apparatus comprising:

a base;

a cover member defining a disk chamber in cooperation with the base;

a spindle motor disposed in the disk chamber;

a hard disk to be rotated by the spindle motor;

a hollow cylindrical portion extending in a direction transverse to that of surfaces of the base and the cover member, the cylindrical portion having an inner portion defining an axially extending armature recess opening for supporting a shaft of a spindle motor;

a projection portion provided on the base and concentrically surrounding the cylindrical portion, the projection portion extending downwardly relative to the base and in a direction parallel to that of the cylindrical portion, the projection portion and the cylindrical portion cooperating with one another to define an annular recess;

the spindle motor comprising a shaft extending through the armature recess, a pair of bearings for rotatably supporting the shaft, a rotor hub to rotate with the shaft and to support the hard disk, field means mounted on the rotor hub, and an armature mounted on an inner portion of the cylindrical portion, the armature being in opposition to the field means; and the annular recess accommodating the pair of bearings, the field means, the armature, and a substantial portion of the shaft to reduce the height of the hard disk apparatus.

8. A hard disk apparatus according to claim 7, wherein said rotor hub has an annular wall axially extending toward and close to the bottom surface of said annular recess, the annular wall and an outer surface of the cylindrical portion being radially close to one another, said field means is fixed to the outer surface of said annular wall, and a labyrinth seal is constituted by said cylindrical portion, said armature, said annular wall and said field means.

9. A hard disk apparatus according to claim 7, wherein an annular groove portion within said disk chamber is formed in said base and located concentrically outwardly relative to said annular recess, an annular projection portion projecting downwards is formed on an outer surface of said rotor hub, and said annular projection portion is closely fitted within said annular groove portion.

10. A hard disk apparatus according to claim 7 further comprising:

a circular recess formed in the hard disk apparatus;

a base portion to receive a fixed shaft;

a fixed shaft extending through the circular recess;

a rotational sleeve member rotatably supported by the fixed shaft by means of bearings;

an arm projecting toward the hard disk secured to the rotational sleeve member; and magnetic heads disposed at a leading portion of the arm so that each of the magnetic heads faces a different side of the hard disk.

11. A hard disk apparatus according to claim 7, wherein a circuit substrate for controlling the rotation of the spindle motor is disposed under the base, the circuit substrate defining a circular hole for surrounding the spindle motor to reduce the height of the hard disk apparatus in an upward/downward direction.

12. A hard disk apparatus according to claim 11, further including:

a through hole defined in a bottom portion of the annular recess; and a lead wire connected to the armature and extending through the through hole to a location outside the hard disk apparatus.

13. A hard disk apparatus according to claim 12, wherein the through hole is sealed with rubber or a synthetic resin.

* * * * *